United States Patent
Guo et al.

(10) Patent No.: US 11,125,922 B2
(45) Date of Patent: Sep. 21, 2021

(54) STRUCTURED RETROREFLECTOR

(71) Applicant: BOE TECHNOLOGY GROUP CO., LTD., Beijing (CN)

(72) Inventors: Kai Guo, Beijing (CN); Xiaolong Li, Beijing (CN); Xueling Gao, Beijing (CN); Kuanjun Peng, Beijing (CN); Shengnan Li, Beijing (CN); Weixing Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 177 days.

(21) Appl. No.: 16/527,751

(22) Filed: Jul. 31, 2019

(65) Prior Publication Data
US 2020/0233124 A1     Jul. 23, 2020

(30) Foreign Application Priority Data
Jan. 23, 2019 (CN) .......................... 201910061745.1

(51) Int. Cl.
*G02B 5/128* (2006.01)
*G02B 1/00* (2006.01)

(52) U.S. Cl.
CPC ............. *G02B 5/128* (2013.01); *G02B 1/005* (2013.01)

(58) Field of Classification Search
None
See application file for complete search history.

(56) References Cited

U.S. PATENT DOCUMENTS 6,365,262 B1 * 4/2002 Hedblom ................ E01F 9/524
428/143
2011/0180779 A1    7/2011 Han et al.

FOREIGN PATENT DOCUMENTS

| CN | 106681026 A | 5/2017 |
| CN | 107272212 A | 10/2017 |
| CN | 108490603 A | 9/2018 |

OTHER PUBLICATIONS

Li et al., "The principle and research progress of metasurfaces", Chinese Optics, Oct. 2017, vol. 10, No. 5, DOI: 10.3788/CO.20171005.0523.

* cited by examiner

*Primary Examiner* — Jennifer D. Carruth
(74) *Attorney, Agent, or Firm* — The Webb Law Firm

(57) ABSTRACT

The present disclosure provides a structured retroreflector. The structured retroreflector includes a transparent substrate, a plurality of transflective structure layers disposed on one side of the transparent substrate and mutually laminated and parallel, wherein distances between any two adjacent transflective structure layers are equal and 0.1λ to 10λ, λ being a wavelength of incident light, and a transparent filling layer disposed between any two adjacent transflective structure layers.

12 Claims, 4 Drawing Sheets

STRUCTURED RETROREFLECTOR

CROSS-REFERENCE TO RELATED APPLICATIONS

This application is based on and claims priority to Chinese Application No. 201910061745.1, filed on Jan. 23, 2019, the disclosure of which is incorporated herein by reference in its entirety.

TECHNICAL FIELD

The present disclosure relates to the field of optical technologies, and in particular, to a structured retroreflector.

BACKGROUND

In the related art, laser is split into a plurality of laser beams by using a metamaterial having a periodic microstructure to form structured light.

SUMMARY

According to a first aspect of an embodiment of the present disclosure, a structured retroreflector is provided. The structured retroreflector including: a transparent substrate; a plurality of transflective structure layers disposed on one side of the transparent substrate and mutually laminated and parallel, wherein distances between any two adjacent transflective structure layers are equal and $0.1\lambda$ to $10\lambda$, $\lambda$ being a wavelength of incident light; and a transparent filling layer disposed between the any two adjacent transflective structure layers, wherein the transparent filling layer has optical uniformity entirely and is filled in entire space between the two adjacent transflective structure layers.

In some embodiments, each transflective structure layer is a metal layer with a rough surface.

In some embodiments, a thickness of the each transflective structure layer is a thickness of 1-10 atoms.

In some embodiments, a material of the each transflective structure layer comprises silver or aluminum.

In some embodiments, a reflectivity of the transparent filling layer is less than a reflectivity of each transflective structure layer.

In some embodiments, a material of the transparent filling layer comprises silicon oxide, silicon nitride or resin.

In some embodiments, the transparent filling layer comprises a plurality of groups of transparent filling sublayers, the transparent filling sublayers in the same group have the same thickness, the transparent filling sublayers in different groups have different thicknesses, projections of the transparent filling sublayers in the same group on the transparent substrate are coincident, and projections of the transparent filling sublayers in different groups on the transparent substrate do not coincide at all.

In some embodiments, the number of the transflective structure layers in each group of transparent filling sublayers is not less than 10.

In some embodiments, each transflective structure layer comprises a plurality of coplanar transparent spheres; a filler in the transparent filling layer is filled in gaps between any adjacent transparent spheres.

In some embodiments, a refractive index of the transparent sphere is larger than a refractive index of the filler.

In some embodiments, the refractive index of the transparent sphere is larger than 2; the refractive index of the filler is not larger than 1.

In some embodiments, a material of the transparent sphere includes resin.

In some embodiments, a diameter of the transparent sphere is $0.5\lambda$ to $2\lambda$.

Other features and advantages thereof of the present disclosure will become apparent from the following detailed description of exemplary embodiments thereof with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure will become more fully understood from the detailed description given herein below with reference to the accompanying drawings, wherein:

it should be understood that the dimensions of the various parts illustrated in the drawings are not drawn according to the actual proportional relationship. Further, the same or similar reference signs denote the same or similar parts.

FIGS. 1A-1C are schematic illustrations of crystal face divisions according to some embodiments of the present disclosure;

FIG. 2 is a schematic structural view of a structured retroreflector according to one embodiment of the present disclosure;

FIG. 3 is a schematic structural view of a structured retroreflector according to another embodiment of the present disclosure;

FIG. 4 is a schematic diagram of a pattern of structured light generated according to the structured retroreflector of FIG. 3;

FIG. 5 is a schematic structural view of a structured retroreflector according to still another embodiment of the present disclosure;

FIG. 6 is a schematic diagram of a pattern of structured light generated according to the structured retroreflector of FIG. 5.

It should be understood that the dimensions of the various parts illustrated in the drawings are not drawn according to the actual proportional relationship. Further, the same or similar reference signs denote the same or similar parts

DETAILED DESCRIPTION OF THE EMBODIMENTS

Various exemplary embodiments of the present disclosure will now be described in detail with reference to the accompanying drawings. The description of the exemplary embodiment(s) is merely exemplary and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials, and numerical values set forth in these embodiments are to be construed as exemplary only and not limiting unless otherwise specifically noted.

The use of "first", "second", and similar terms in this disclosure does not denote any order, quantity, or importance, but rather the terms are used to distinguish one element from another. The word "comprise" or "include", and the like, means that elements preceding the word encompass elements listed after the word, and do not exclude the possibility of other elements also being encompassed.

All terms (including technical or scientific terms) used in the present disclosure have the same meaning as commonly understood by one of ordinary skill in the art to which the present disclosure belongs, unless otherwise specifically defined. It will be further understood that terms, such as those defined in commonly used dictionaries, should be interpreted as having a meaning that is consistent with their meaning in the context of the relevant art and will not be interpreted in an idealized or overly formal sense unless so expressly defined herein.

Techniques, methods, and devices known to those of ordinary skill in the relevant art may not be discussed in detail, but are to be considered a part of the specification where appropriate.

The inventors have found through research that the structured retroreflector in the related art has a complicated structure and cannot simply and conveniently generate structured light. Furthermore, the inventors have noted that the crystal comprises individual crystal planes parallel to each other, and distances between adjacent crystal planes are the same. That is, the crystal has a three-dimensional array structure. Diffraction of the laser light as it passes through different crystal planes is enhanced in a particular direction, thereby producing structured light.

Accordingly, the present disclosure provides a structured retroreflector with a simple structure.

Figure 1A:
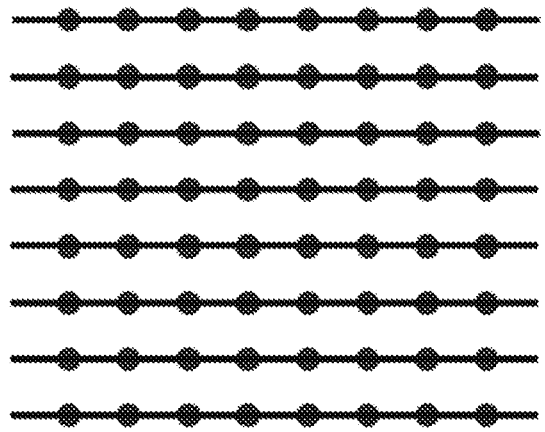
Figure 1B:
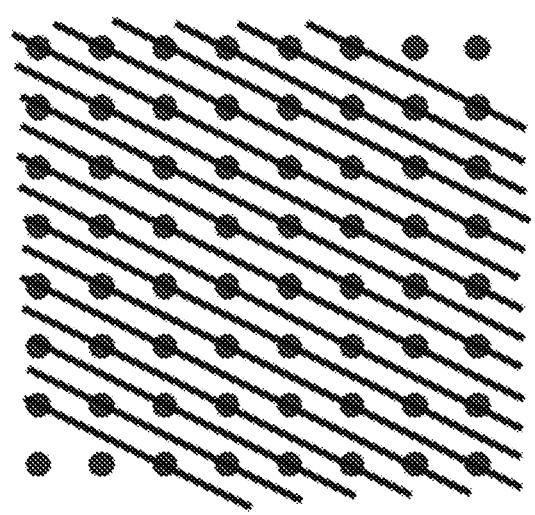
Figure 1C:
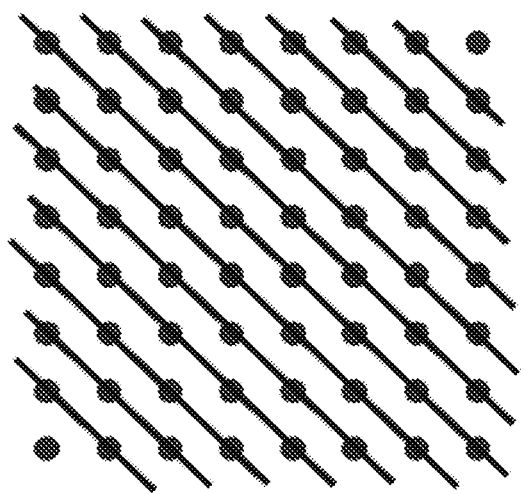

FIGS. 1A to 1C are schematic diagrams of crystal plane division of a crystal according to some embodiments of the present disclosure.

FIGS. 1A to 1C show different crystal plane division methods. Different crystal plane division methods result in different distance between adjacent crystal planes and different orientations of the crystal planes.

Accordingly, the present disclosure provides a structured retroreflector that generates structured light using a three-dimensional array structure.

Figure 2:
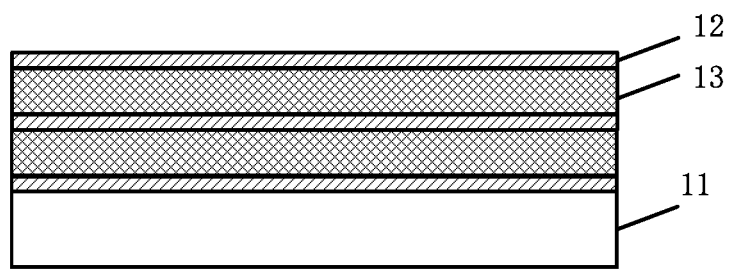

FIG. 2 is a schematic structural view of a structured retroreflector according to one embodiment of the present disclosure.

As shown in FIG. 2, the structured retroreflector includes a transparent substrate 11, a plurality of transflective structure layers 12 disposed on one side of the transparent substrate 11, and a transparent filling layer 13 disposed between any two adjacent transflective structure layers 12. The plurality of transflective structure layers 12 are mutually laminated and parallel. The transparent filling layer 13 has optical uniformity entirely and fills the entire space between two adjacent transflective structure layers.

In the structured retroreflector, distances between any two adjacent transflective structure layers 12 are equal and $0.1\lambda$ to $10\lambda$, where $\lambda$ is the wavelength of incident light. Thus, light emitted from the structured retroreflector forms a curve having a shape such as a circle, an ellipse, or a hyperbola on a projection surface.

In some embodiments, the number of transflective structure layers 12 is not less than 10 layers, in order to be able to obtain better performing structured light.

In the structured retroreflector provided in the above-described embodiments of the present disclosure, the structured light may be conveniently generated by simulating a three-dimensional array structure of a crystal using a plurality of transflective structure layers laminated and parallel to each other.

In some embodiments, the transflective structure layer 12 is a metal layer with a rough surface. By providing the rough surface on the metal layer, incident light is more easily scattered on the metal layer. It should be noted that the rough surface of the metal layer means that the surface of the metal layer is not even, for example, the metal layer is provided with protruding particles or grooves. This makes it easy for the incident light to scatter on the surface of the metal layer.

In some embodiments, a material of the metal layer includes silver, aluminum, or other colorless metal. By utilizing colorless metal, the influence of the metal layer on light transmission can be effectively reduced.

In some embodiments, the metal layer has a thickness of 1 to 10 atomic layers, so that light can pass through the metal layer smoothly.

In some embodiments, a reflectivity of the transparent filling layer 13 is less than that of the transflective structure layer 12. Since the reflectivity of the transflective structure layer 12 is larger than that of the transparent filling layer 13, the diffraction of the laser light when the laser light passes through different crystal surfaces is further enhanced.

In some embodiments, a material of the transparent filling layer 13 includes silicon oxide, silicon nitride, resin or other transparent materials.

It should be noted that the pattern formed on a projection surface by the structured light emitted by the structured retroreflector in the above embodiment is circular. A thickness of the transparent filling layer is positively correlated to a radius of the circular pattern. That is, the larger the thickness of the transparent filling layer, the larger the radius of the corresponding circular pattern. The smaller the thickness of the transparent filling layer, the smaller the radius of the corresponding circular pattern.

In some embodiments, the transparent filling layer in the structured retroreflector comprises a group of transparent filling sublayers. The transparent filling sublayers in the group are of the same thickness. In other embodiments, the transparent filling layer in the structured retroreflector comprises a plurality of groups of transparent filing sublayers. The transparent filler sublayers in the same group have the same thickness, the transparent filler sublayers in different groups have different thicknesses, projections of the transparent filling sublayers in the same group on the transparent substrate are coincide, and projections of the transparent filling sublayers in different groups on the transparent substrate do not coincide at all.

Figure 3:
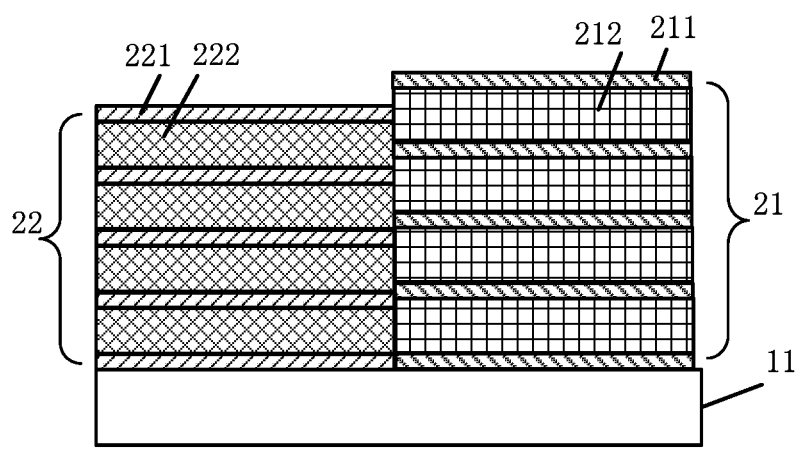

FIG. 3 is a schematic structural view of a structured retroreflector according to another embodiment of the present disclosure. For simplicity, two groups of transparent filling sublayers are shown in the embodiment shown in FIG. 3. Each transparent filling sublayer has optical uniformity entirely and fills all space between two adjacent transflective structure layers. A thickness of the transflective structure layer 211 in the first group of transparent filling sublayers 21 is the same as a thickness of the transflective structure layer 221 in the second group of transparent filling sublayers 22. A thickness of the transparent filling sublayer 212 in the first group of transparent filling sublayers 21 is larger, and a thickness of the transparent filling sublayer 222 in the second group of transparent filling sublayers 22 is smaller.

Figure 4:
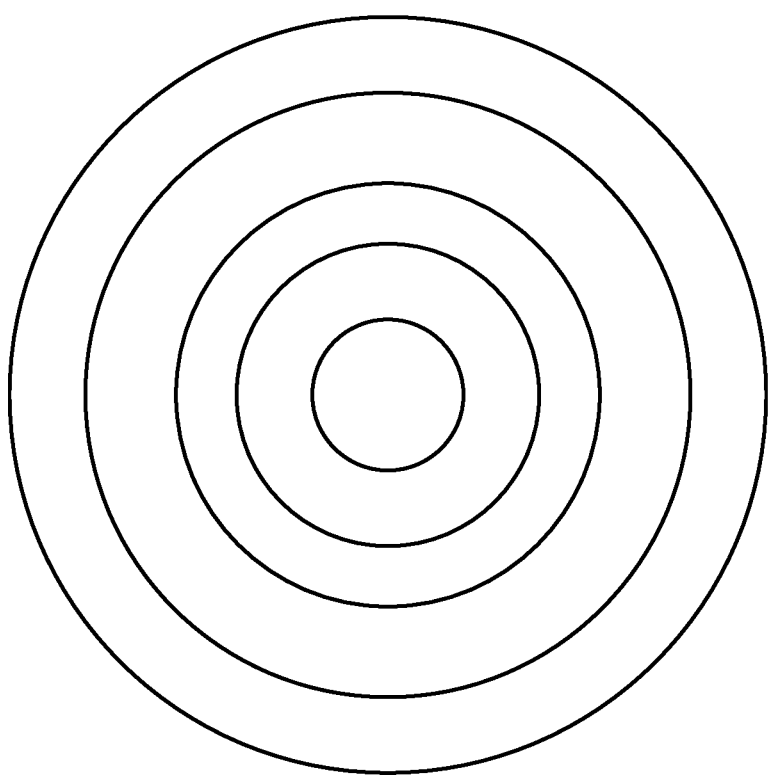

FIG. 4 is a schematic diagram of a pattern of structured light generated according to the structured retroreflector of FIG. 3.

In the embodiment shown in FIG. 3, two groups of transparent filler sublayers are included in the structured retroreflector. Since the thickness of the transparent filling sublayer in the first group of transparent filling sublayers 21 is larger, a radius of the corresponding circular pattern is also larger. In addition, since the thickness of the transparent filling sublayer in the second group of transparent filling sublayers 22 is smaller, a radius of the corresponding circular pattern is also smaller. Two groups of concentric circles are obtained, and the centers of the concentric circles in each group are very close to each other. For structured light projected onto a human face, the centers of the two groups of concentric circles may be considered to be the same, as shown in FIG. 4, since the ratio of a distance between the structured retroreflector and the human face to a distance between the adjacent transparent filling sublayers is very large. The principle is the same for the case of multiple groups of transparent filling layers.

It can be seen that by providing multiple groups of transparent filling sublayers in a structured retroreflector, the thicknesses of the transparent filling sublayers in different groups are different, thereby obtaining a plurality of corresponding concentric circles. By using a plurality of concentric circles, the identification of the stereo structure is facilitated.

In some embodiments, the number of transflective structure layers 12 is no less than 10 layers in each group of transparent filling sublayers.

Figure 5:
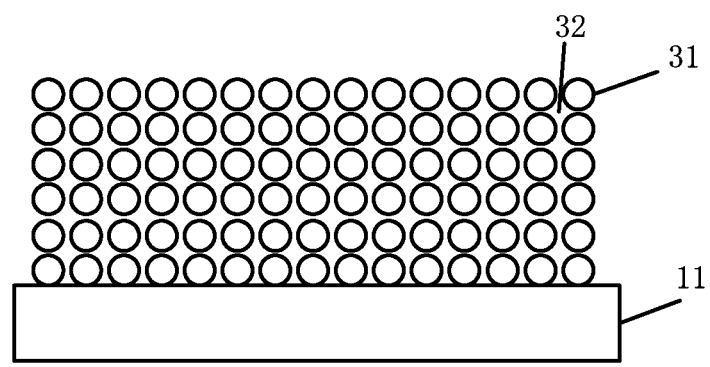

FIG. 5 is a schematic structural view of a structured retroreflector according to still another embodiment of the present disclosure. FIG. 5 differs from FIG. 2 in that in the embodiment of FIG. 5, the transflective structure layer comprises a plurality of coplanar transparent spheres 31. The filler 32 in the transparent filling layer is filled in the gap between any adjacent transparent spheres 31.

It can be explained here that the coplanar means that the centers of the transparent spheres are on the same plane.

In some embodiments, a refractive index of the transparent sphere 31 is larger than that of the filler 32, thereby spatially forming a photonic crystal structure with a periodic distribution of refractive indices.

The inventors found through studies that the larger the deviation of the refractive index of the transparent sphere 31 from the refractive index of the filler 32, the better the performance of the resulting structured light.

In some embodiments, a material of the transparent sphere 31 is a transparent material having a refractive index larger than 2, and a material of the filler 32 is a transparent material having a refractive index not larger than 1. For example, the material of the transparent sphere 31 includes resin or other transparent material satisfying the refractive index requirement.

In some embodiments, the transparent spheres 31 have a diameter of $0.5\lambda$ to $2\lambda$, $\lambda$ being the wavelength of the incident light.

Figure 6:
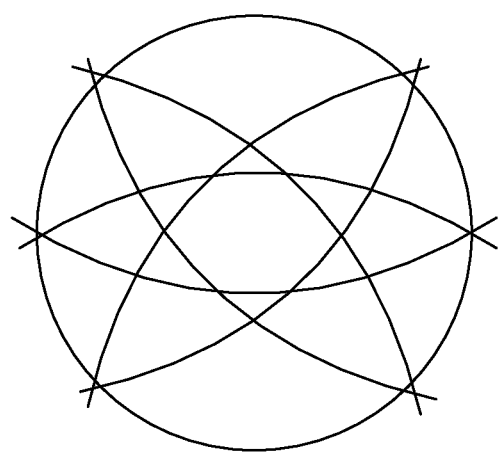

FIG. 6 is a schematic diagram of a pattern of structured light generated according to the structured retroreflector of FIG. 5.

For example, in the structured retroreflector shown in FIG. 5, the distance between the adjacent transflective structure layers is 3.0 μm. By irradiating the structured retroreflector with laser light having a wavelength of 632.8 nm, the structured light emitted by the structured retroreflector forms a pattern on a projection surface as shown in FIG. 6.

So far, embodiments of the present disclosure have been described in detail. Some details that are well known in the art have not been described in order to avoid obscuring the concepts of the present disclosure. Those skilled in the art can fully understand how to implement the technical solutions disclosed herein based on the above description.

While certain specific embodiments of the present disclosure have been described in detail by way of example, it should be understood by those skilled in the art that the above examples are illustrative only and are not intended to limit the scope of the present disclosure. It will be understood by those skilled in the art that modifications may be made to the above embodiments or equivalents may be substituted for elements thereof without departing from the scope and spirit of the present disclosure. The scope of the present disclosure is defined by the appended claims.

What is claimed is:

1. A structured retroreflector, comprising:
a transparent substrate;
a plurality of transflective structure layers disposed on one side of the transparent substrate and mutually laminated and parallel, wherein distances between any two adjacent transflective structure layers are equal and $0.1\lambda$ to $10\lambda$, $\lambda$ being a wavelength of incident light; and
a transparent filling layer disposed between the any two adjacent transflective structure layers, wherein the transparent filling layer has optical uniformity entirely and is filled in entire space between the two adjacent transflective structure layers, and the transparent filling layer comprises a plurality of groups of transparent filling sublayers, transparent filling sublayers in the same group have the same thickness, transparent filling sublayers in different groups have different thicknesses, projections of the transparent filling sublayers in the same group on the transparent substrate are coincident, and projections of the transparent filling sublayers is different groups on the transparent substrate do not coincide at all.

2. The structured retroreflector of claim 1, wherein each transflective structure layer is a metal layer with a rough surface.

3. The structured retroreflector of claim 2, wherein a thickness of the each transflective structure layer is a thickness of 1-10 atoms.

4. The structured retroreflector of claim 2, wherein a material of the each transflective structure layer comprises silver or aluminum.

5. The structured retroreflector of claim 1, wherein a reflectivity of the transparent filling layer is less than a reflectivity of each transflective structure layer.

6. The structured retroreflector of claim 5, wherein a material of the transparent filling layer comprises silicon oxide, silicon nitride or resin.

7. The structured retroreflector of claim 1, wherein the number of the transflective structure layers in each group of transparent filling sublayers is not less than 10.

8. The structured retroreflector of claim 1, wherein each transflective structure layer comprises a plurality of coplanar transparent spheres;
a filler in the transparent filling layer is filled in gaps between any adjacent transparent spheres.

9. The structured retroreflector of claim 8, wherein a refractive index of each transparent sphere is larger than a refractive index of the filler.

10. The structured retroreflector of claim 9, wherein the refractive index of each transparent sphere is larger than 2; and
the refractive index of the filler is not larger than 1.

11. The structured retroreflector of claim 10, wherein a material of each transparent sphere includes resin.

12. The structured retroreflector of claim 8, wherein a diameter of each transparent sphere is $0.5\lambda$ to $2\lambda$.

* * * * *

UNITED STATES PATENT AND TRADEMARK OFFICE
CERTIFICATE OF CORRECTION

PATENT NO.         : 11,125,922 B2
APPLICATION NO.    : 16/527751
DATED              : September 21, 2021
INVENTOR(S)        : Kai Guo et al.

It is certified that error appears in the above-identified patent and that said Letters Patent is hereby corrected as shown below:

In the Claims

Column 6, Line 30, Claim 1, delete "is" and insert -- in --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*